United States Patent
Gron, Jr. et al.

(10) Patent No.: US 9,739,184 B2
(45) Date of Patent: Aug. 22, 2017

(54) START OF AN INTERNAL COMBUSTION ENGINE WITH AT LEAST ONE ENGINE VALVE IN AN OPEN STATE DURING CRANKING

(71) Applicant: Jacobs Vehicle Systems, Inc., Bloomfield, CT (US)

(72) Inventors: G. Michael Gron, Jr., Granby, CT (US); Justin Damien Baltrucki, Manchester, CT (US); Neil Fuchs, New Hartford, CT (US); John J. Lester, West Hartford, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 15/184,904

(22) Filed: Jun. 16, 2016

(65) Prior Publication Data
US 2016/0290186 A1 Oct. 6, 2016

Related U.S. Application Data

(63) Continuation of application No. 14/133,090, filed on Dec. 18, 2013, now Pat. No. 9,410,455.
(Continued)

(51) Int. Cl.
*F01L 13/08* (2006.01)
*F01L 1/18* (2006.01)
(Continued)

(52) U.S. Cl.
CPC .............. *F01L 13/08* (2013.01); *F01L 1/181* (2013.01); *F01L 13/0015* (2013.01);
(Continued)

(58) Field of Classification Search
CPC ....... F01L 13/08; F01L 13/0015; F01L 1/181; F01L 13/06; F01L 2013/0094;
(Continued)

(56) References Cited

U.S. PATENT DOCUMENTS 3,547,087 A 12/1970 Siegler
4,423,709 A 1/1984 Arrieta
(Continued)

FOREIGN PATENT DOCUMENTS

DE 19616951 A1 10/1997
JP S60188806 U 12/1985

OTHER PUBLICATIONS

International Preliminary Report on Patentability for PCT/US2013/076136, dated Jun. 23, 2015.
(Continued)

*Primary Examiner* — Hung Q Nguyen
(74) *Attorney, Agent, or Firm* — Moreno IP Law LLC

(57) ABSTRACT

Start-up of an internal combustion engine comprises maintaining one or more engine valves in an engine cylinder in a continuously open state for more than one engine cycle during engine cranking. When it is determined that an engine parameter or transmission oil pressure has reached a predetermined value, maintenance of the one or more engine valves in the continuously open state is discontinued and fuel is subsequently provided to the engine cylinder for engine start-up. In various embodiments, the engine parameter may comprise an engine temperature parameter, an engine pressure parameter or an engine electrical parameter.

16 Claims, 9 Drawing Sheets

Related U.S. Application Data

(60) Provisional application No. 61/738,794, filed on Dec. 18, 2012.

(51) Int. Cl.
  *F01L 13/06* (2006.01)
  *F02M 31/04* (2006.01)
  *F01L 13/00* (2006.01)
  *F02D 13/02* (2006.01)

(52) U.S. Cl.
  CPC .......... *F01L 13/06* (2013.01); *F02D 13/0246* (2013.01); *F02M 31/042* (2013.01); *F01L 2001/186* (2013.01); *F01L 2013/0094* (2013.01); *F01L 2760/001* (2013.01); *F01L 2800/01* (2013.01); *F01L 2800/03* (2013.01); *F01L 2810/03* (2013.01); *F01L 2820/031* (2013.01); *F01L 2820/034* (2013.01); *F02D 2013/0292* (2013.01); *Y02T 10/126* (2013.01)

(58) Field of Classification Search
  CPC ............. F01L 2760/001; F01L 2800/01; F01L 2800/03; F01L 2820/031; F01L 2001/186; F01L 2820/034; F02D 13/0246; F02D 2013/0292
  See application file for complete search history.

(56) References Cited

U.S. PATENT DOCUMENTS

| | | | |
|---|---|---|---|
| 4,648,362 | A | 3/1987 | Kastlunger |
| 4,945,870 | A | 8/1990 | Richeson |
| 5,094,198 | A | 3/1992 | Trotta |
| 5,117,790 | A | 6/1992 | Clarke |
| 5,632,238 | A | 5/1997 | Furukawa et al. |
| 6,092,496 | A | 7/2000 | Bhargava |
| 6,655,349 | B1 | 12/2003 | Cavanagh |
| 2005/0274341 | A1 | 12/2005 | Usko |
| 2006/0081213 | A1 | 4/2006 | Yang |
| 2006/0272608 | A1 | 12/2006 | Hara et al. |
| 2006/0289214 | A1 | 12/2006 | Katsuhiro et al. |
| 2007/0084653 | A1 | 4/2007 | Hughes |
| 2007/0234991 | A1* | 10/2007 | Leman .................... F01L 1/053 123/179.18 |
| 2008/0223325 | A1 | 9/2008 | Meistrick |
| 2009/0292441 | A1* | 11/2009 | Kawai ..................... F01L 13/00 701/103 |
| 2010/0006062 | A1 | 1/2010 | Yang |
| 2011/0114060 | A1 | 5/2011 | Jeon |

OTHER PUBLICATIONS

International Search Report for PCT/US2013/076136, dated May 20, 2014.

* cited by examiner

START OF AN INTERNAL COMBUSTION ENGINE WITH AT LEAST ONE ENGINE VALVE IN AN OPEN STATE DURING CRANKING

CROSS-REFERENCE TO RELATED APPLICATION

The instant application is a continuation of co-pending U.S. patent application Ser. No. 14/133,090 entitled "Rocker Latch For Controlling Engine Valve Actuation" and filed on Dec. 18, 2013, which prior application claims the benefit of Provisional U.S. Patent Application Ser. No. 61/738,794 entitled "Rocker Latch For Controlling Engine Valve Actuation" and filed on Dec. 18, 2012, the teachings of which prior applications are incorporated herein by this reference.

FIELD

The present invention relates generally to systems and methods for controlling engine valves in an internal combustion engine. In particular, the present invention relates to systems and methods for preventing an engine valve from closing when acted on by a pivoting rocker arm.

BACKGROUND

Valve actuation in an internal combustion engine is required in order for the engine to produce positive power, as well as for engine braking. During positive power, intake valves may be opened to admit fuel and air into a cylinder for combustion. The exhaust valves may be opened to allow combustion gas to escape from the cylinder.

Internal combustion engines may not only be used to produce positive power, but to also provide bleeder type engine braking. During bleeder engine braking, in addition to the main exhaust valve event, one or more exhaust valve(s) may be held slightly open by an amount sufficient to provide bleeder braking throughout the remaining engine cycles (i.e., the intake, compression, and expansion cycles for a full-cycle bleeder brake) The initial opening of the exhaust valves in a bleeder braking operation may be in advance of top dead center (TDC) of the compression stroke, and is preferably near a bottom dead center (BDC) point between the intake and compression cycles. As such, a bleeder type engine brake may require much lower force to actuate the valves, and generate less noise due to continuous bleeding instead of the rapid blow-down of a compression-release type brake. Thus, an engine bleeder brake can have significant advantages.

During start-up and shut-down, an internal combustion engine may shudder and shake as it compresses air at low engine speeds. Moreover, it may be particularly difficult to achieve adequately high cranking speeds, to charge and activate the valve actuation system with hydraulic fluid when the fluid is cold and has a higher viscosity. Holding open an intake and/or exhaust valve during engine start-up may decompress the cylinder so that the piston may move towards a TDC position more easily. An engine decompression system may hold open one or more intake and/or exhaust valves in an engine cylinder during the start-up or shut-down of the engine. Thus, just when the engine is about to shut down, the engine decompression system may be activated to hold the intake and/or exhaust valve(s) open by a lift sufficient to decompress the engine. The valve lift may be controlled so that the piston may not run into the valve, but the lift may be adequate to let the pressure in and out of the cylinder.

An engine decompression system of the type described herein may be particularly useful in cold weather conditions, when cranking battery power is lower, cranking time to start-up is increased, the fuel/air mixture is less likely to ignite, and the engine is more difficult to turn over. In addition, engine decompression, which may reduce battery power and starter system requirements, may result in lower weight components, which permit increased fuel efficiency, and avoidance or reduction in the need for additional starting aids. Reduction in start-up time resulting from use of a decompression system may also provide emissions benefits. Decompression shutdown may also result in a randomization of engine stopping angle, which may aid in a more evenly distributed wearing of the starter gear and the flywheel ring gear. Accordingly, advantages such as these, but not limited to the foregoing, may be realized by use of one or more of the embodiments of the invention described herein.

Various embodiments of the present invention may meet one or more of the aforementioned needs and provide other benefits as well.

SUMMARY

Responsive to the foregoing challenges, Applicant has developed an innovative system for preventing a rocker arm actuated engine valve from closing, said system comprising: a rocker arm pivotally mounted on a rocker shaft; a structure mounted adjacent to the rocker arm in a fixed position relative to the rocker arm; a latch piston slidably disposed between the rocker arm and the structure, and a latch piston actuator operatively connected to the latch piston, wherein said latch piston is adapted to assume an extended position causing the latch piston to engage both the rocker arm and the structure to limit the pivotal motion of the rocker arm, wherein the latch piston actuator is adapted to exert a force on the latch piston to cause the latch piston to assume the extended position or to retract from the extended position, and wherein the latch piston further comprises an engagement surface adapted to maintain the latch piston in the extended position continuously when the latch piston actuator ceases to exert force on the latch piston.

Applicant has also developed an innovative method of decompressing an internal combustion engine cylinder comprising the steps of: pivoting a rocker arm in a first direction to open an engine valve associated with the engine cylinder and the rocker arm; pivoting the rocker arm in a second direction so that the engine valve moves in a closing direction; exerting an actuation force on a latch piston to cause the latch piston to engage the rocker arm and a structure adjacent to the rocker arm, or to disengage the rocker arm from the structure; maintaining the engine valve in an open position in response to the latch piston engaging the rocker arm and the structure; and maintaining the latch piston in a position in which it engages the rocker arm and the structure after the actuation force on the latch piston ceases to be exerted so that the engine valve maintains an open position.

Applicant has also developed an innovative method of starting an internal combustion engine, comprising the steps of: maintaining one or more engine valves, in an engine cylinder, in a continuously open state for more than one engine cycle during engine cranking; discontinuing maintaining the one or more engine valves in a continuously open state after an engine parameter has reached a predetermined value; and providing fuel to the engine cylinder for engine start-up subsequent to the discontinuation of maintaining the one or more engine valves in a continuously open state.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

Figure 2:
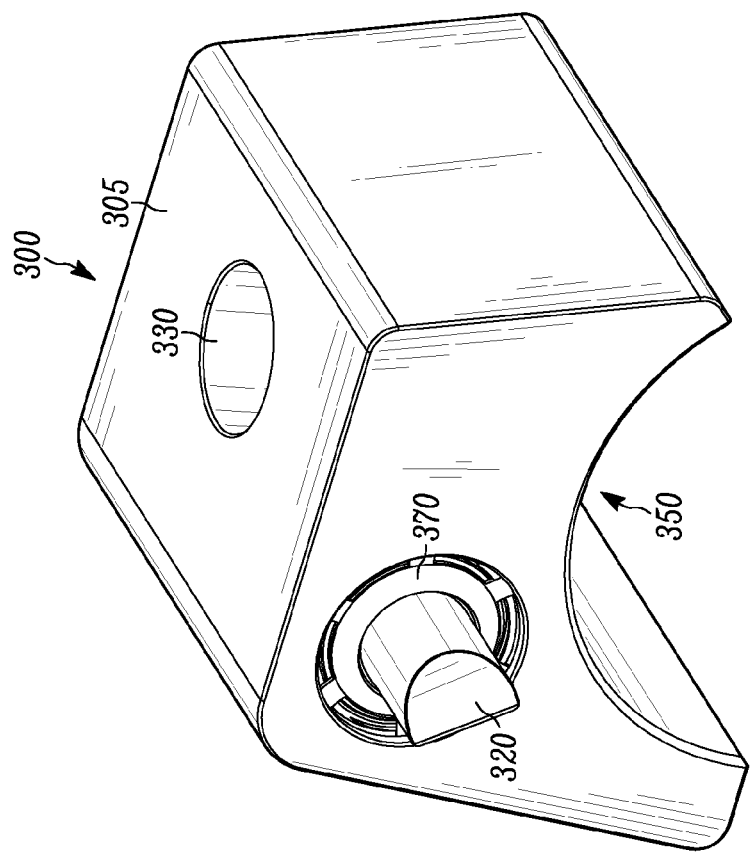
FIG. 2 is an isometric view of the rocker latch for controlling engine valve actuation according to an embodiment of the invention.

It will be appreciated that for purposes of clarity and where deemed appropriate, reference numerals have been repeated in the figures to indicate corresponding features, and that the various elements in the drawings have not necessarily been drawn to scale in order to better show the features of the invention. The drawings are exemplary only, and should not be construed as limiting the invention.

DETAILED DESCRIPTION OF THE PRESENT EMBODIMENTS

Reference will now be made in detail to embodiments of the systems and methods of the present invention, examples of which are illustrated in the accompanying drawings. As embodied herein, embodiments of the present invention include systems and methods of actuating one or more engine valves.

Figure 1:
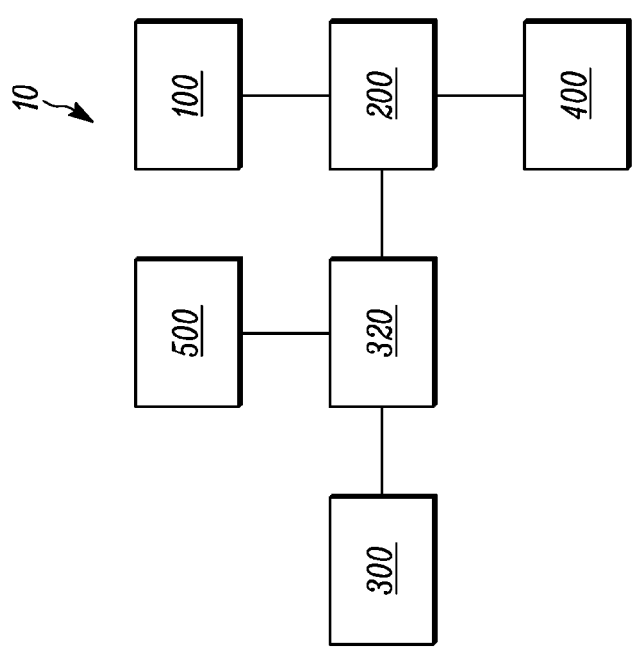
FIG. 1 is a block diagram of an engine valve actuation system in accordance with an embodiment of the present invention.

An embodiment of the present invention is shown schematically in FIG. 1 as valve actuation system 10. The valve actuation system 10 may include a rocker actuator 100, such as a cam, push tube, or other valve train element, operatively connected to a rocker arm 200. The rocker actuator 100 may be adapted to selectively apply motion to the rocker arm 200. The rocker arm 200 may be operatively connected to one or more engine valves 400 or a valve bridge (not shown), which in turn may act on the engine valves. A structure 300, which is fixed in position relative to the pivoting rocker arm 200, may be mounted adjacent (i.e., near) to the rocker arm. A latch piston or bar 320 (collectively referred to herein as a latch piston) may selectively extend between the structure 300 and the rocker arm 200 so as to selectively engage either the rocker arm or structure relative to the other. The latch piston 320 may control engine valve actuation by limiting the pivoting motion of the rocker arm 400 relative to the structure 300.

The latch piston 320 may be selectively acted upon by a latch piston actuator 500 such that it extends, or is retracted from extending, between the structure 300 and the rocker arm 200. When the latch piston 320 is extended, it may prevent the rocker arm from pivoting fully backward under the influence of the engine valve springs. As a result of the impediment to the pivoting motion of the rocker arm 200, the engine valve(s) 400 may be maintained slightly open throughout the full cycle of the engine. The engine valves 400 may comprise one or more exhaust valves, intake valves, or auxiliary valves. The selective extension of the latch piston 320 may cause the engine valves 400 to produce an engine valve event, including, but not limited to, a bleeder braking event and/or engine decompression.

In a first embodiment, the latch piston 320 may be switched between the modes of preventing the rocker arm 200 from pivoting into an engine valve closed position and not preventing the rocker arm from pivoting into an engine valve closed position in response to input from a latch piston actuator 500. The latch piston actuator 500 may comprise any hydraulic, electro-magnetic, mechanical, pneumatic or gas actuation device or system capable of extending the latch piston 320 between the structure 300 and the rocker arm 200 to hold open one or more engine valves for initial engine start-up, shut-down, or bleeder braking. For example, in one embodiment of the present invention, the latch piston actuator 500 may control a supply valve to supply activation fluid, such as hydraulic fluid or air or gases, to selectively extend the latch piston 320. The latch piston actuator 500 may include a means for electronic control, which may include, for example, a microprocessor, linked to other engine component(s), to determine and select the appropriate times at which to extend the latch piston 320.

Engine decompression events may be optimized at a plurality of engine operating conditions (e.g., speeds, loads, etc.) based upon information collected from the engine component(s). The information collected may include, without limitation, engine speed, vehicle speed, oil temperature, manifold (or port) temperature, manifold (or port) pressure, cylinder temperature, cylinder pressure, particulate information, and/or crank angle.

Figure 3:
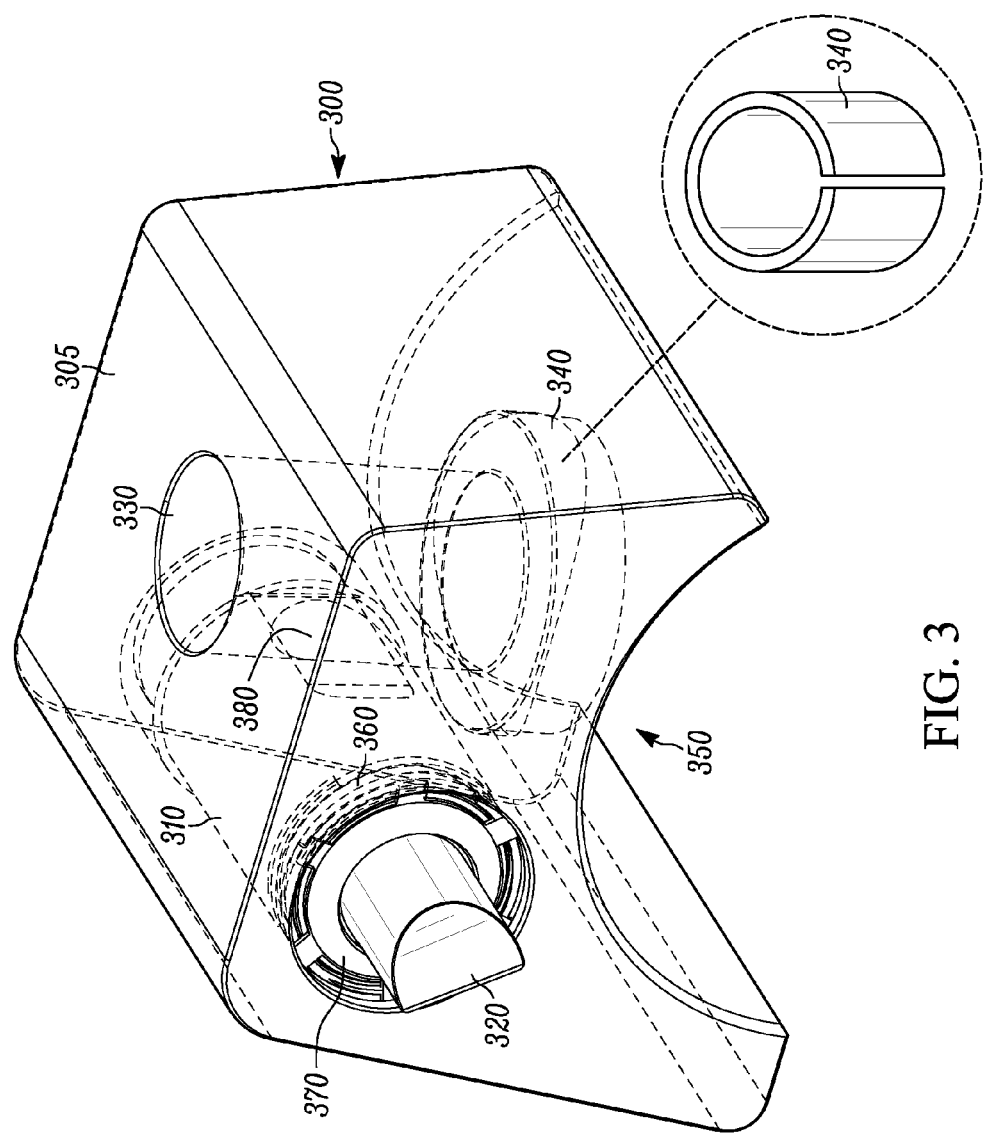
FIG. 3 is an isometric view of the rocker latch for controlling engine valve actuation according to an embodiment of the invention.

A first embodiment of the present invention is shown in FIG. 2, in which like reference characters refer to like elements. With reference to FIGS. 2-9, the structure 300, may be provided in the form of a housing 305 mounted in a fixed position adjacent to the rocker arm 200. In the embodiment illustrated, the structure 300 may be mounted on a rocker shaft 250, however, it is appreciated that it could be mounted to the engine cylinder head, or other surface so long as it is fixed in position relative to the pivoting motion of the rocker arm 200. As shown in FIGS. 2 and 3, the housing 305 may include a finished surface 350 that is adapted to wrap around the rocker shaft. The finished surface 350 may be shaped such that it forms a close fit around the rocker shaft.

Figure 5:
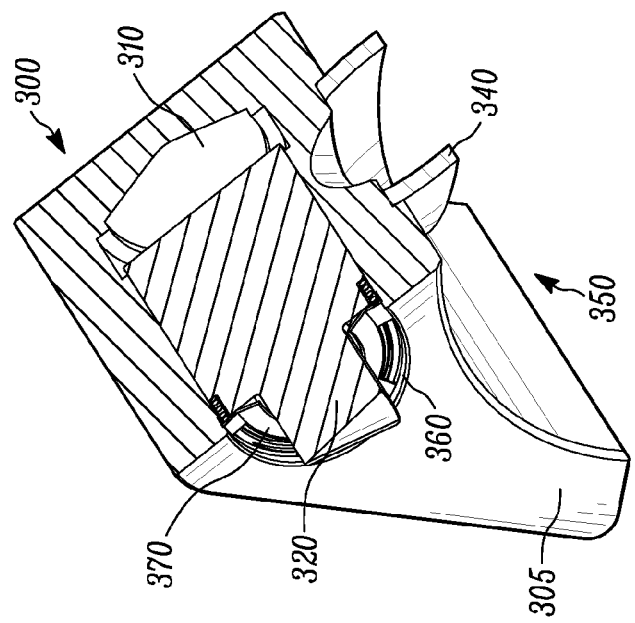
FIG. 5 is a partial cross sectional isometric view of a rocker latch for controlling engine valve actuation according to an embodiment of the invention.
Figure 4:
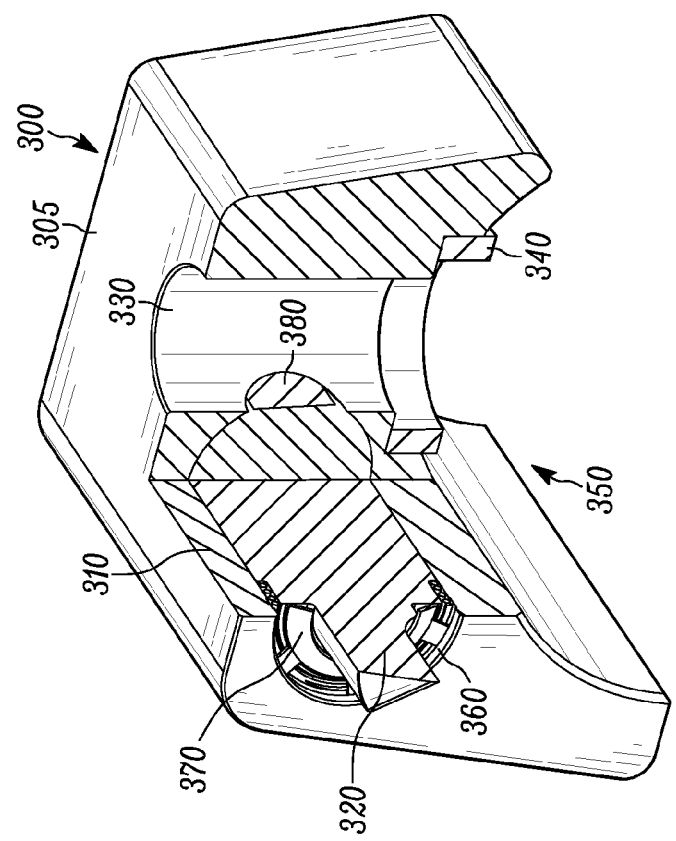
FIG. 4 is a partial cross-sectional isometric view of the rocker latch for controlling engine valve actuation according to an embodiment of the invention.
Figure 7:
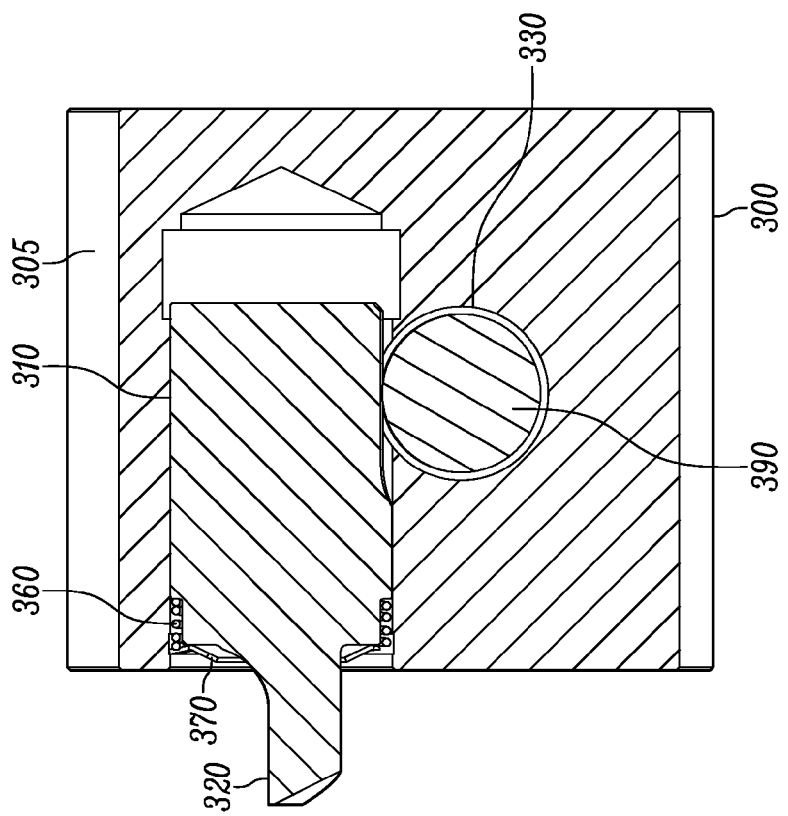
FIG. 7 is a cross sectional view of the rocker latch for controlling engine valve actuation according to an embodiment of the invention.
Figure 6:
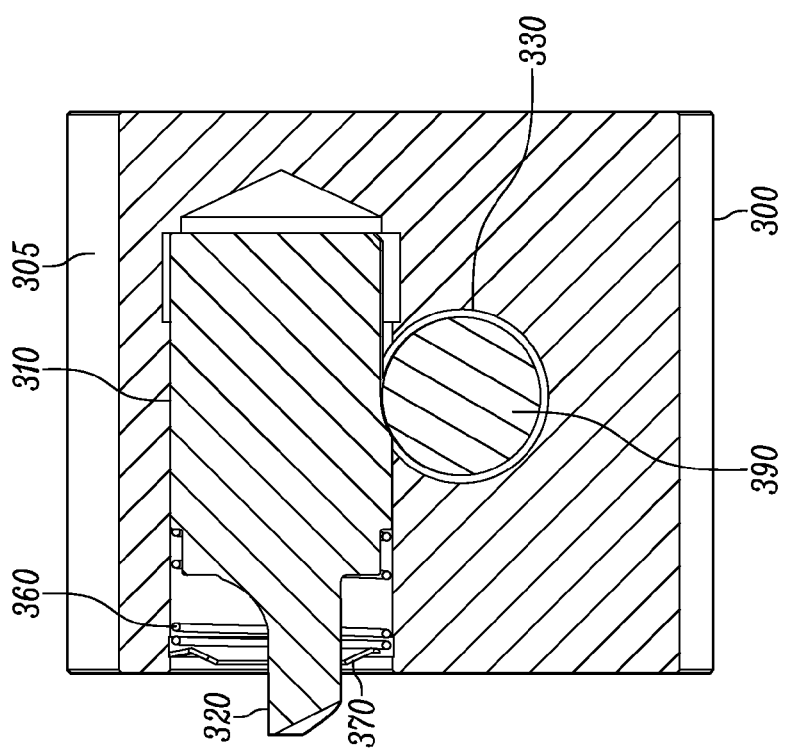
FIG. 6 is a cross sectional view of the rocker latch for controlling engine valve actuation according to an embodiment of the invention.
Figure 9:
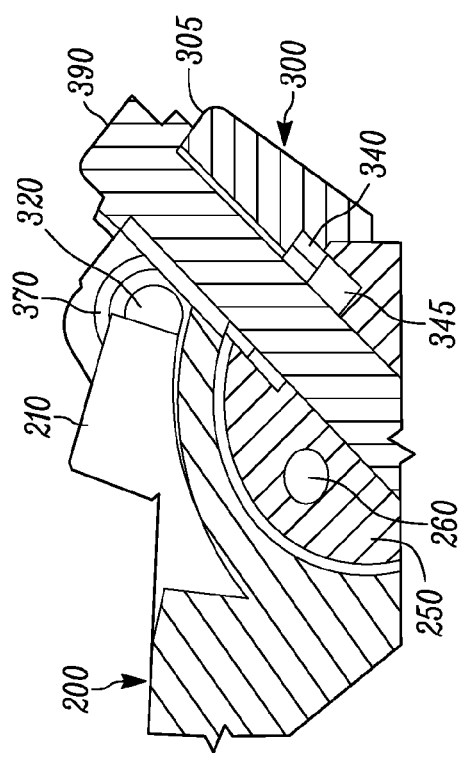
FIG. 9 is a cross sectional view of the rocker latch for controlling engine valve actuation and the rocker arm according to an embodiment of the invention.

As shown in FIGS. 4, 6, and 7, the housing 305 may contain a latch piston bore 310, and a bolt bore or hole 330 which intersect with each other. As shown in FIGS. 5-7, the latch piston bore 310 may have an open end and a closed end that terminates in the housing 305. As shown in FIGS. 3, 4, and 9, both ends of the bolt hole 330 may be open such that a bolt 390 may pass through the bolt hole to fixedly secure the housing 305 on to the rocker shaft 250. The bolt 390 may pass through the rocker shaft 250 to fixedly secure the housing 305 on to the bearing cap or the engine cylinder head.

With reference to FIGS. 2-7, a latch piston 320 may be slidably disposed within the latch piston bore 310 such that an end of the latch piston extends out of the latch piston bore 310 toward the rocker arm 200. The latch piston 320 may have a shoulder separating the narrow and broad ends of the latch piston. A piston retaining ring 370 may be located near the open end of the latch piston bore 310. The piston retaining ring 370 may have a central opening through which the narrow end of the latch piston 320 extends. A spring 360 may extend between the piston retaining ring 370 and the shoulder of the latch piston 320 to bias the latch piston into the latch piston bore 310.

Figure 8:
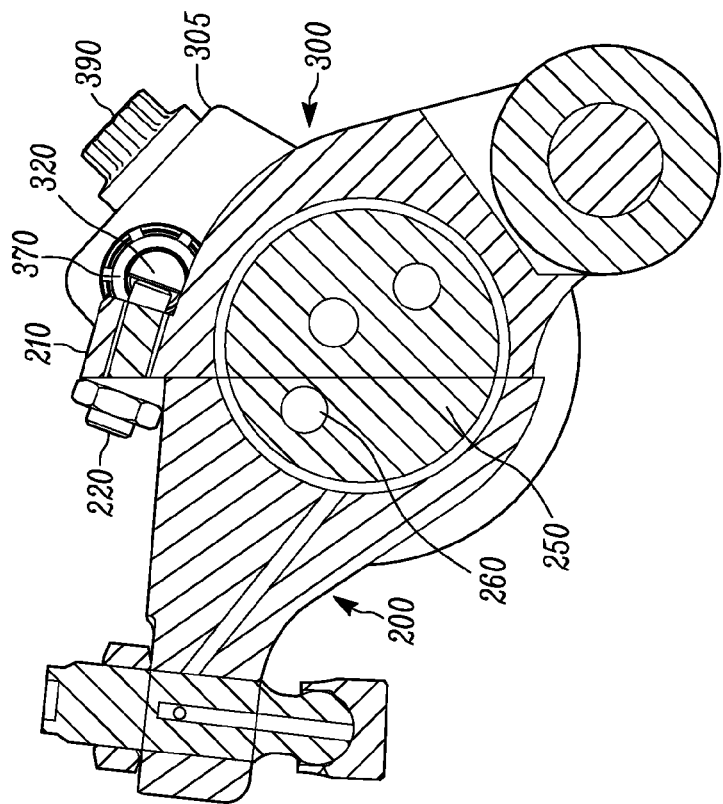
FIG. 8 is a cross sectional view of the rocker latch for controlling engine valve actuation and the rocker according to an embodiment of the invention.
Figure 11:
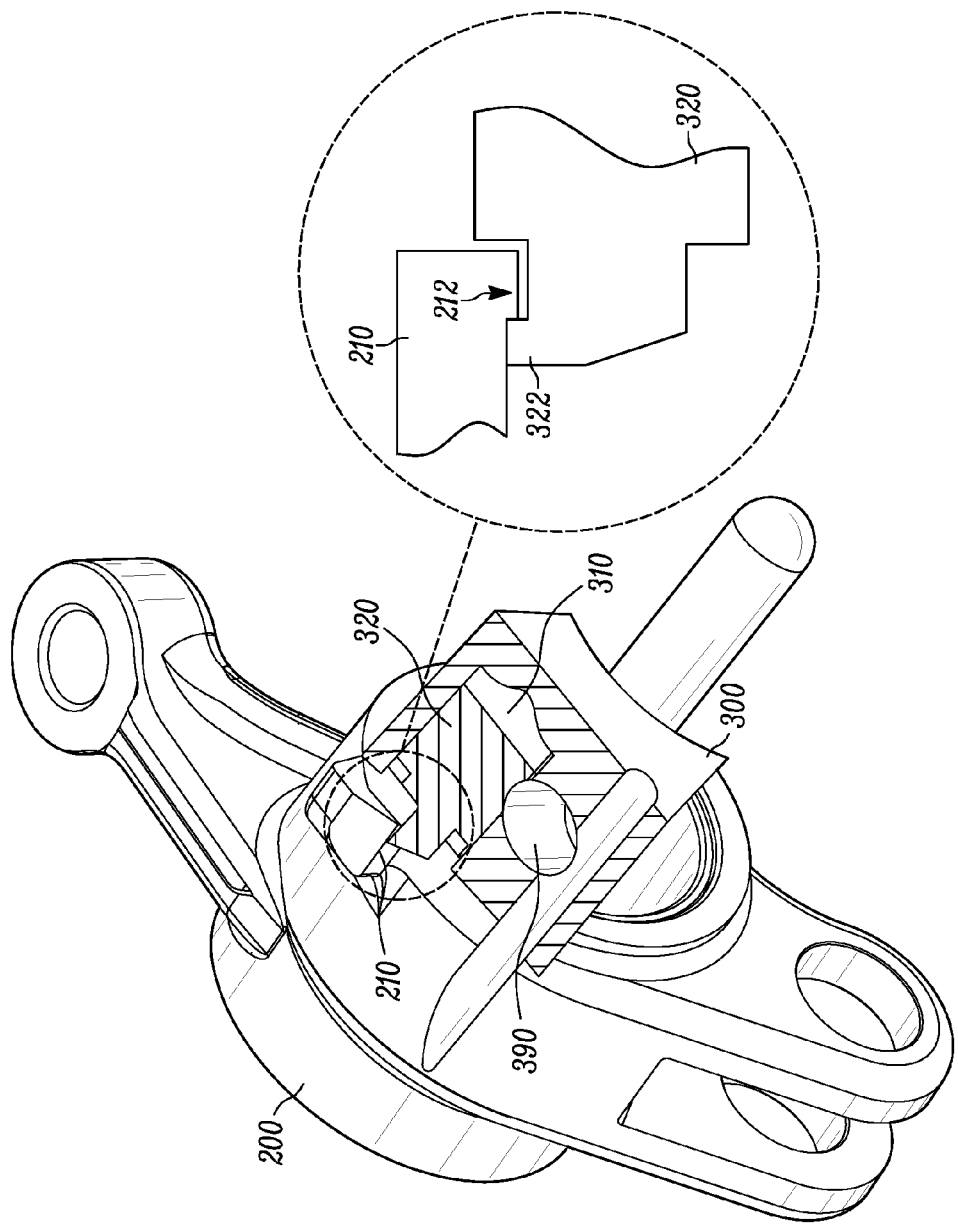
FIG. 11 is a partial cross sectional view of a rocker latch in accordance with an alternative embodiment of the invention.

The diameter of the narrow end of the latch piston 320 may taper linearly, progressively, or less than linearly from the shoulder of the latch piston 320 to its terminus. As shown in FIG. 9, the narrow end of the latch piston 320 may selectively contact a boss 210 disposed on the rocker arm 200. As shown in FIG. 8, in an alternate embodiment, a lash adjustment screw 220 may extend from the boss 210 and the narrow end of the latch piston 320 may contact the lash adjustment screw 220 to interrupt or limit the pivoting motion of the rocker arm 200. The narrow end of the latch piston 320 may have a contact surface adapted to engage the rocker arm boss 210 or adjustment screw 220. Specifically, the narrow end of the latch piston 320 may be provided with a surface adapted to engage the rocker arm boss 210 or adjustment screw 220 such that the contact between the two causes the latch piston to be maintained in its extended position even when the latch piston actuator 500 ceases to exert its full actuation force on the latch piston. The latch piston may be maintained in its extended position as a result of the force of the engine valve springs acting through the rocker arm 200 to jam the latch piston 320 into the wall of the latch piston bore 310. Alternatively, with reference to FIG. 11, the latch piston 320 may include an engagement structure 322 which may interlock with a mating engagement structure 212 provided on the rocker arm boss 210 or adjustment screw (not shown) Thus, the narrow end of the latch piston 320 shown in FIGS. 9 and 11, may remain engaged against the rocker arm boss 210 or adjustment screw 220 even after the engine shuts down and the latch piston actuator 500 ceases to exert its full actuation force on the latch piston. As a result, one or more cylinders of the engine may be in a decompressed state at the initiation of engine start-up.

As shown in FIGS. 8 and 9, a bolt 390 may be inserted into the bolt hole 330 to removably attach the housing 305 on to the rocker shaft 250. With reference to FIG. 3, a recess 380 having a flat surface may be adapted to buttress the latch piston 320 against the bolt 390 disposed in the bolt hole 330, thereby preventing the latch piston 320 from rotating within the latch piston bore 310.

As shown in FIGS. 3, 4, 5, and 9, a dowel ring 340 may be disposed around one open end of the bolt hole 330, which is on the finished surface 350 side of the housing 305. The dowel ring 340 may fit into the counter bore 345 on the rocker shaft 250 to align the rocker latch 300 on the rocker shaft 250. The dowel ring 340 may be press fit in the open end of the bolt hole 330 on the finished surface 350 side of the housing 305 to locate the housing 305 on the rocker shaft 250. As shown in FIG. 3, the dowel ring 340 may have a split to enable it to be inserted into and removed from the counter bore 345 on the rocker shaft 250.

Hydraulic fluid may be supplied to the housing 305 from a hydraulic fluid supply (not shown). The hydraulic fluid supply may be connected to the housing 305 through a control valve (not shown). As shown in FIGS. 8 and 9, hydraulic fluid may flow from the hydraulic fluid supply through a fluid supply/drain passage 260 formed in the rocker shaft 250 to the bolt hole 330.

The bolt hole 330 may be oversized such that the hydraulic fluid may wash up around the bolt 390 to flow into and out of the latch piston bore 310 at the intersection of the latch piston bore and the bolt hole. The control valve may regulate the supply of hydraulic fluid to and from the bolt hole 330. Other hydraulic arrangements for supplying hydraulic fluid to the housing 305 are considered well within the scope and spirit of the present invention.

As noted above, the fluid supplied may be hydraulic fluid or any other suitable fluid. For example, in an alternate embodiment, the latch piston 320 may be actuated by pneumatic air or gases that are supplied to the latch piston bore 310. The pneumatic air/gases may be supplied to the housing 305 through a control valve (not shown). In another alternate embodiment, shown in FIG. 10, the latch piston 320 may be slidably disposed in a latch piston bore 310 formed in the rocker arm 200. As described above, a spring 360 and piston retaining ring 370 may bias the latch piston 320 into the latch piston bore 310. A key 395 may be disposed in a bore or hole formed in the rocker arm such that the key 395 may allow the latch piston 320 to slide along the axis of the latch piston bore 310, but may prevent the latch piston 320 from rotating in the latch piston bore 310.

Figure 10:
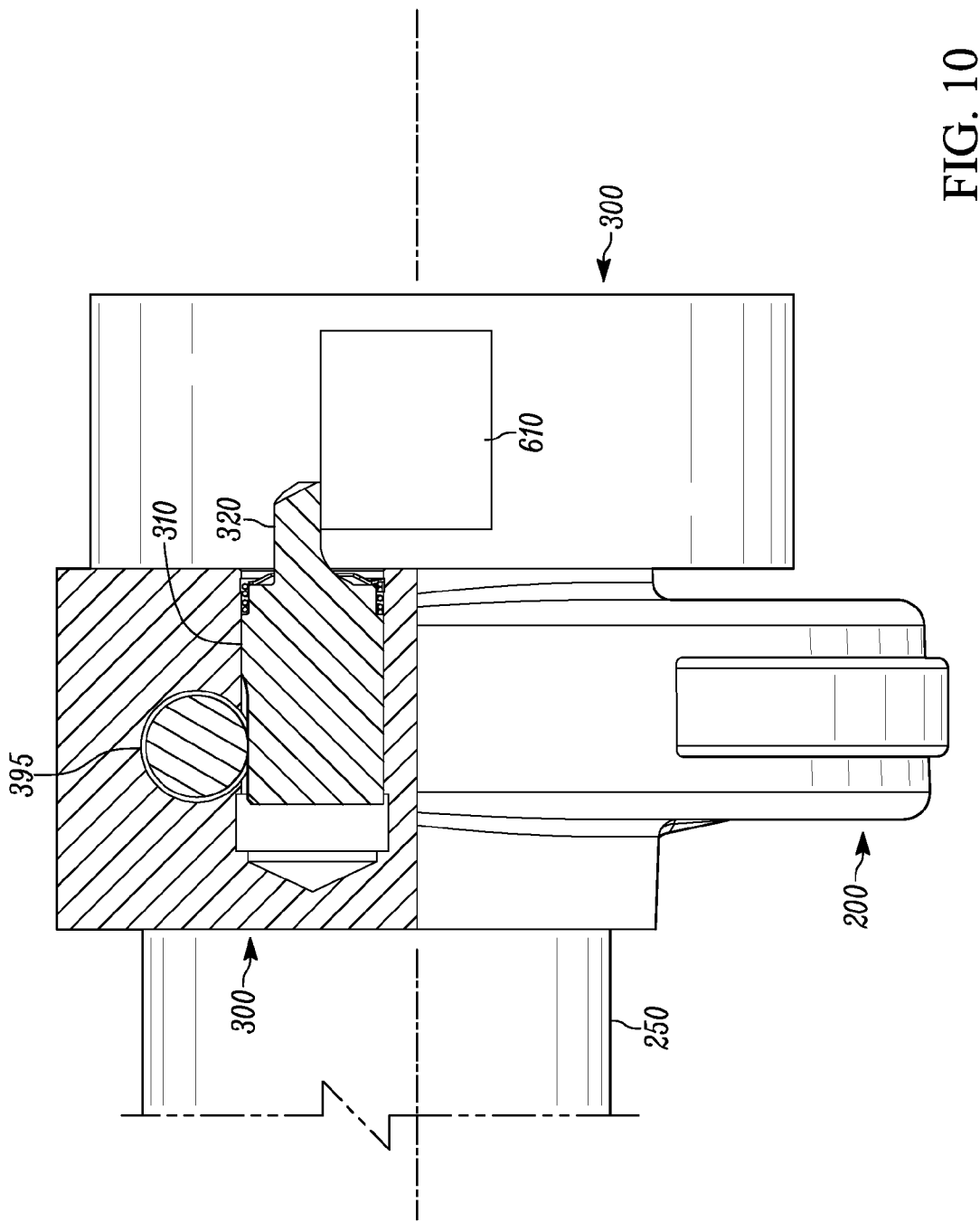
FIG. 10 is a partial cross sectional view of the rocker latch for controlling engine valve actuation and the rocker arm according to an embodiment of the invention.

In the FIG. 10 embodiment, the structure 300 may be attached to the rocker shaft, rocker cap, rocker shaft cap, cylinder head or other structure which is fixed in position relative to the pivoting motion of the rocker arm 200. The structure 300 may include a boss 610 that is adapted to be selectively engaged by the latch piston 320, as shown in FIG. 10. In an alternate embodiment, a lash adjustment screw (see FIG. 8) may extend from the boss 610 and the narrow end of the latch piston 320 may selectively engage the lash adjustment screw to interrupt or limit the pivoting motion of the rocker arm 200. The FIG. 10 embodiment may be operated in like fashion to the embodiment illustrated in FIGS. 2-9.

Figure 12:
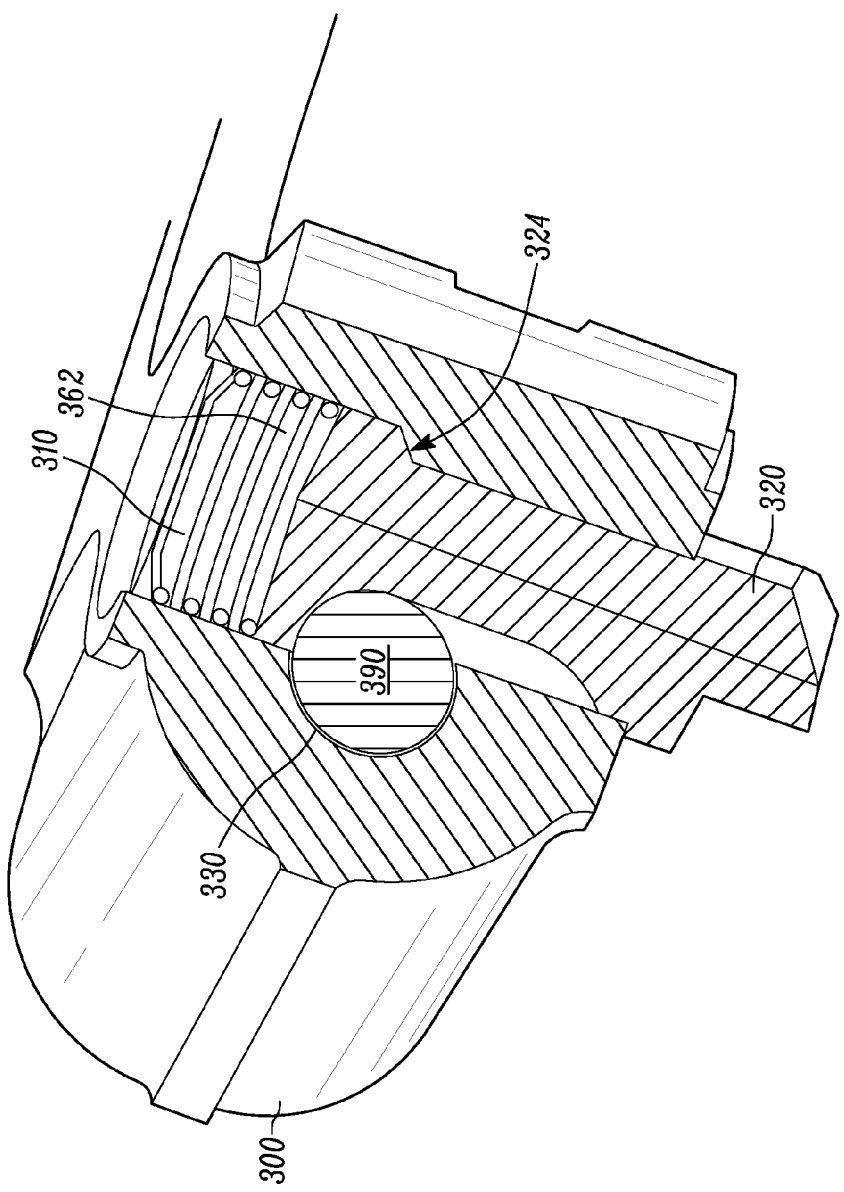
FIG. 12 is a partial cross sectional view of a rocker latch in accordance with another alternative, active control, embodiment of the invention.

In yet another alternative embodiment, described generally as an active control embodiment, the latch piston 320 may be normally biased into an extended position in which it engages both the structure 300 and the rocker arm 200 to keep an engine valve open. With reference to FIG. 12, in which like reference characters refer to like elements and which illustrates an active control embodiment of the invention, the structure 300 may include a latch piston bore 310 in which a latch piston 320 is slidably disposed. A spring 362 may bias the latch piston 320 out of the latch piston bore 310 towards a rocker arm (not shown). Specifically, the spring 362 may normally bias the latch piston 320 out of the latch piston bore 310 towards a rocker arm when no hydraulic fluid pressure is actively supplied to the system.

A bolt 390 (or alternatively, a key 395 shown in other embodiments) may be provided in the bolt hole 330. The bolt 390 (or key 395) may engage a recess provided in the latch piston 320 to prevent it from rotating in the latch piston bore 310. The bolt hole 330 may be sized to permit hydraulic fluid to be supplied to the latch piston bore 310 through the bolt hole, as explained above, under the control of a controller. The latch piston 320 may be provided with a force receiving surface 324, such as a shoulder, upon which the force of hydraulic fluid supplied through the bolt hole 330 may act on the latch piston 320 to push it into the latch piston bore 310 against the bias of the spring 362. The supply of hydraulic fluid pressure (or other force) to the latch piston 320 causes it to disengage the rocker arm in the active control embodiment, as opposed to engage the rocker arm in the previously described embodiments.

Operation of an embodiment of the present invention will now be described. With regard to FIGS. 2-9, the embodiment shown therein may provide cylinder decompression during engine start-up, shut-down, or bleeder braking by holding open one or more engine valves (not shown) as a result of the latch piston 320 being selectively extended between the structure 300 and the rocker arm 200. As shown in FIG. 6, when no decompression is required, the latch piston 320 maybe biased into the latch piston bore 310 by the spring 360 so that the rocker arm may pivot freely without contacting the latch piston.

As shown in FIG. 7, when hydraulic fluid is supplied to the latch piston bore 310, the hydraulic fluid pressure may overcome the bias of the spring 360 and push the latch piston 320 out of the latch piston bore such that the narrow end of the latch piston engages rocker arm boss 210 or adjustment screw 220. In the exemplary embodiment, the latch piston 320 may be pushed out of the latch piston bore 310 almost simultaneously when the rocker arm 200 lifts above the height required for the latch piston 320 to extend. As shown in FIG. 8, the projecting latch piston 320 may interrupt the rotation of the rocker arm 200 and prevent it from pivoting back completely, thereby holding the engine valve open, for example, by an amount sufficient to provide engine decompression and/or bleeder braking. During engine operation, the hydraulic fluid acting on the latch piston 320 causes it to hold the rocker arm 200 open unless the controller 500 turns off the hydraulic fluid supply.

When the engine shuts down while the controller 500 maintains hydraulic fluid supply, the oil pressure drops, and, over time, the hydraulic fluid pressure in the latch piston bore 310 may abate, such that sufficient hydraulic fluid is not present in the latch piston bore to overcome the bias of spring 360. Nevertheless, at this time, the rocker arm 200 is being pushed against the latch piston 320 by the bias of the valve spring (not shown). The force exerted by the valve spring may be sufficient to press the rocker arm 200 upward with sufficient force to prevent the bias of the spring 360 from pushing the latch piston 320 out of engagement with the rocker arm. In other words, the bias of the valve spring locks the latch piston 320 and the rocker arm 200 together, as explained above. Thus, the rocker arm 200 may be held open to allow the engine to partially decompress during subsequent engine start-up.

In the embodiments shown in FIGS. 2-10, if the engine has six cylinders, for example, when the engine shuts down, rocker arms for four out of the six cylinders may be latched into an open decompressed state by the process described above. The remaining two rocker arms may be in some intermittent stage of opening engine valves, or the engine valves may be closed, so that when the hydraulic pressure ceases to be exerted on the latch pistons associated with these rocker arms, the spring 360 may retract the latch pistons, and these valves may close (or remain closed if closed already) under bias of the valve springs upon engine start-up. When the engine is restarted the four rocker arms that are latched open may partially decompress the engine to improve starting speed and potentially provide the benefits described above.

When the engine restarts, the rocker arms 200 that are latched open may allow the engine to decompress so that the starter can get the engine moving and prevent the engine from shuddering. As the engine spins through its start-up cycle, the camshaft may relieve the pressure exerted by the rocker arms 200 on the latch pistons 320 and may permit the springs 360 to retract the latch pistons 320 into the housings 305. Latch piston retraction and engine compression may occur within two (2) engine rotations. Latch piston retraction and engine compression occurring in more or less than two (2) engine revolutions are also considered well within the scope and spirit of the present invention.

The embodiment shown in FIGS. 2-10 may also provide bleeder type engine braking during engine operation by holding open one or more exhaust valves. As described above, the rocker arm for one or more exhaust valve(s) may be held open by the latch piston 320 of the rocker latch 300. The one or more exhaust valve(s) may be held slightly open throughout the remaining engine cycles (full-cycle bleeder brake) or during a portion of the remaining engine cycles (partial-cycle bleeder brake). Likewise, the embodiment shown in FIGS. 2-10 may also provide exhaust gas recirculation by holding the valves open for the exhaust gases to recirculate.

For systems with active control capability, an example of which is described above in connection with FIG. 12, the engine control system can include a start-up control strategy which enables closed loop feedback of the engine based on one or more engine parameters. For example, with reference to FIGS. 12 and 13, when an active control embodiment of the invention is employed and the engine is at rest, in a shut-down state or potentially as a result of engine stall, the latch piston 320 may be extended into a position in which it engages both the structure 300 and a rocker arm under the influence of the spring 362. As a result, one or more of the engine valves may be latched into an open position.

Figure 13:
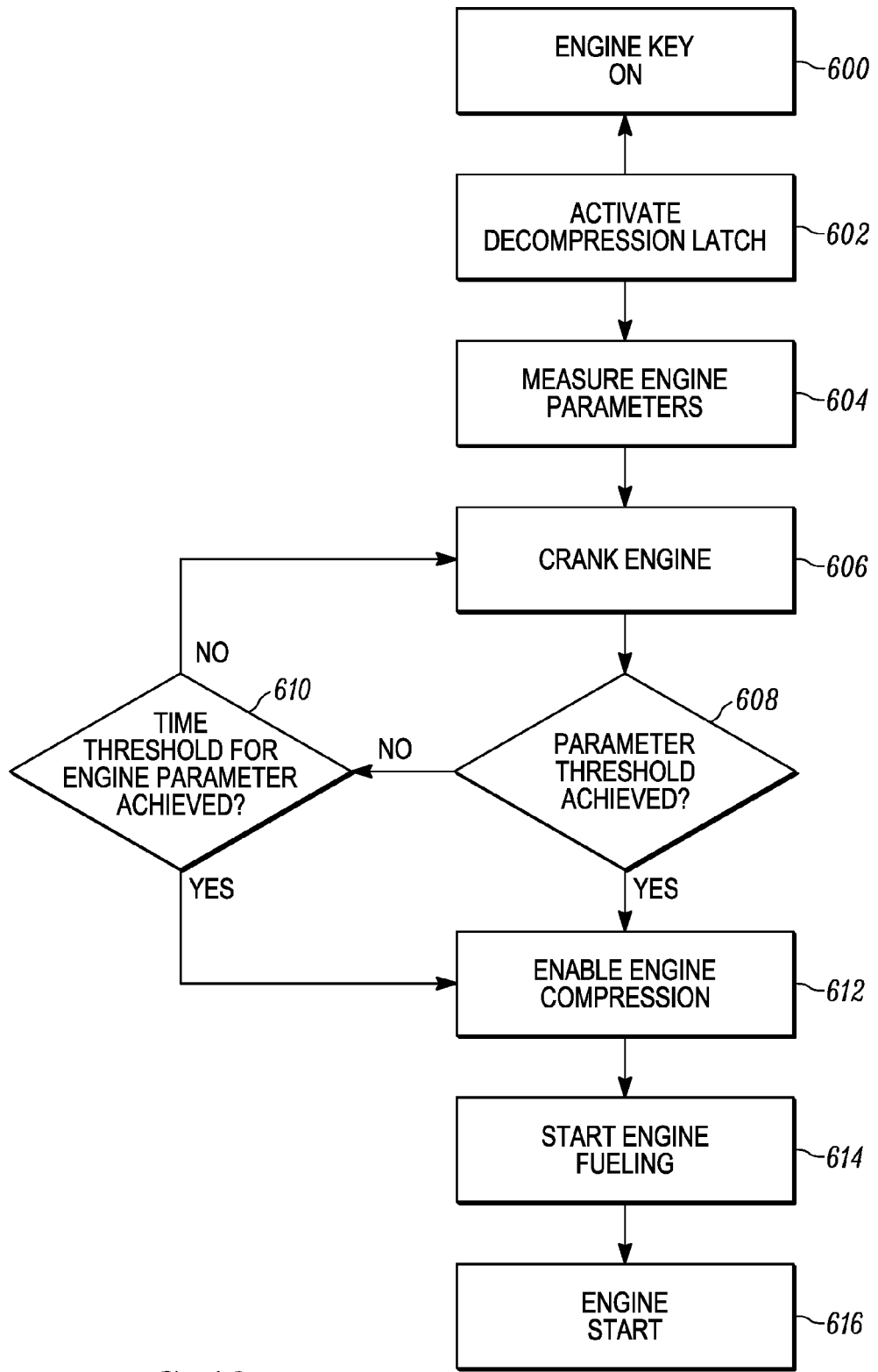
FIG. 13 is a flow chart illustrating the steps of starting an internal combustion engine while in a partial decompressed state.

With reference to FIG. 13, engine start-up may be initiated by turning the engine key into an on position in step 600. Turning the engine key on may cause the latch piston to be extended to engage the structure 300 and a rocker arm in step 602 if the latch piston is not already extended as a result of the engine being shut down. Turning the key on may also cause the controller to measure one or more engine parameters, referenced above, in step 604 and cause the starter to crank the engine in step 606. If the one or more measured engine parameters are determined to meet or exceed threshold values in step 608, hydraulic fluid may be provided to the active control latch piston 320 to cause the latch piston to disengage the rocker arm and enable engine compression in the associated engine cylinder in step 612. If the engine parameter value is not met or exceeded, then the controller may determine in step 610 whether a time duration threshold has been exceeded. If a time threshold value is exceeded, then hydraulic fluid may be provided to the active control latch piston 320 to cause the latch piston to disengage the rocker arm and enable engine compression in the associated engine cylinder in step 612. If neither the engine parameter threshold value nor the time threshold value have been met or exceeded in steps 608 and 610, the engine may continue to be cranked in step 606 in a decompressed, or partially decompressed, state. Once the engine compression is enabled in step 612, fuel may be supplied in step 614 and engine start completed in step 616.

With continued reference to FIG. 13, the monitored engine parameter(s) may include one or more of coolant temperature, intake manifold air temperature, oil pressure, fuel pressure, engine speed, exhaust temperature, metal temperature, intake manifold pressure, cylinder pressure, cylinder temperature, engine speed variation, starter motor current draw, battery voltage, alternator current, transmission oil pressure. The control sequence illustrated in FIG. 13 can also be modified to include a step of verifying that the engine is in a decompressed state prior to starting cranking.

In alternative embodiments of the present invention, the engine cylinder associated with a described engine valve actuation system 10 may be further provided with heated cylinder inlet air for improved engine start-up while using engine decompression. The heated inlet air may be provided by an electric resistance heater or combustion oil flame burner, for example. A temperature sensor may be provided for measuring ambient temperature, or engine temperature.

It will be apparent to those skilled in the art that variations and modifications of the present invention can be made without departing from the scope or spirit of the invention. For example, pneumatic fluid may be used instead of a hydraulic fluid in the above embodiments without departing from the invention's intended scope. Further, instead of the bolt, the housing could be anchored on the rocker shaft using any other commercially available means without departing from the invention's intended scope.

What is claimed is:

1. A method of starting an internal combustion engine, comprising the steps of:
    maintaining one or more engine valves in an engine cylinder in a continuously open state for more than one engine cycle during engine cranking;
    determining whether an engine temperature parameter has reached a predetermined value;
    discontinuing maintaining the one or more engine valves in the continuously open state when it is determined that the engine temperature parameter has reached the predetermined value; and
    providing fuel to the engine cylinder for engine start-up subsequent to the discontinuation of maintaining the one or more engine valves in the continuously open state.

2. The method of claim 1, wherein the engine temperature parameter comprises one or more of coolant temperature, ambient temperature, intake manifold air temperature, exhaust temperature, metal temperature and cylinder temperature.

3. The method of claim 1, further comprising, when the engine temperature parameter has not reached the predetermined value:
    determining whether a time threshold has reached a time duration threshold;
    discontinuing maintaining the one or more engine valves in the continuously open state when it is determined that the time threshold has reached the time duration threshold.

4. The method of claim 1, further comprising the steps of:
    providing heated air to the engine cylinder while maintaining the one or more engine valves in a continuously open state for more than one engine cycle during engine cranking.

5. A method of starting an internal combustion engine, comprising the steps of:
    maintaining one or more engine valves in an engine cylinder in a continuously open state for more than one engine cycle during engine cranking;
    determining whether an engine pressure parameter has reached a predetermined value;
    discontinuing maintaining the one or more engine valves in the continuously open state when it is determined that the engine pressure parameter has reached the predetermined value; and
    providing fuel to the engine cylinder for engine start-up subsequent to the discontinuation of maintaining the one or more engine valves in the continuously open state.

6. The method of claim 5, wherein the engine pressure parameter comprises engine fuel pressure.

7. The method of claim 5, further comprising, when the engine pressure parameter has not reached the predetermined value:
    determining whether a time threshold has reached a time duration threshold;
    discontinuing maintaining the one or more engine valves in the continuously open state when it is determined that the time threshold has reached the time duration threshold.

8. The method of claim 5, further comprising the steps of:
    providing heated air to the engine cylinder while maintaining the one or more engine valves in a continuously open state for more than one engine cycle during engine cranking.

9. A method of starting an internal combustion engine, comprising the steps of:
    maintaining one or more engine valves in an engine cylinder in a continuously open state for more than one engine cycle during, engine cranking;
    determining whether an engine electrical parameter has reached a predetermined value;
    discontinuing maintaining the one or more engine valves in the continuously open state when it is determined that the engine electrical parameter has reached the predetermined value; and
    providing fuel to the engine cylinder for engine start-up subsequent to the discontinuation of maintaining the one or more engine valves in the continuously open state.

10. The method of claim 9, wherein the engine electrical parameter comprises one or more of starter motor current draw, battery voltage and alternator current.

11. The method of claim 9, further comprising, when the engine electrical parameter has not reached the predetermined value:
    determining whether a time threshold has reached a time duration threshold;
    discontinuing maintaining the one or more engine valves in the continuously open state when it is determined that the time threshold has reached the time duration threshold.

12. The method of claim 9, further comprising the steps of:
providing heated air to the engine cylinder while maintaining the one or more engine valves in a continuously open state for more than one engine cycle during engine cranking.

13. A method of starting an internal combustion engine, comprising the steps of:
maintaining one or more engine valves in an engine cylinder in a continuously open state for more than one engine cycle during engine cranking;
determining whether transmission oil pressure has reached a predetermined value;
discontinuing maintaining the one or more engine valves in the continuously open state when it is determined that the transmission oil pressure has reached the predetermined value; and
providing fuel to the engine cylinder for engine start-up subsequent to the discontinuation of maintaining the one or more engine valves in the continuously open state.

14. The method of claim 5, wherein the engine pressure parameter comprises engine oil pressure.

15. The method of claim 5, wherein the engine pressure parameter comprises intake manifold pressure.

16. The method of claim 5, wherein the engine pressure parameter comprises cylinder pressure.

* * * * *